(12) United States Patent
Padhi et al.

(10) Patent No.: US 7,594,423 B2
(45) Date of Patent: Sep. 29, 2009

(54) KNOCK SIGNAL DETECTION IN AUTOMOTIVE SYSTEMS

(75) Inventors: Kabi P. Padhi, Ann Arbor, MI (US); Patrick W. Menter, Dearborn, MI (US)

(73) Assignee: Freescale Semiconductor, Inc., Austin, TX (US)

( * ) Notice: Subject to any disclaimer, the term of this patent is extended or adjusted under 35 U.S.C. 154(b) by 32 days.

(21) Appl. No.: 11/936,250

(22) Filed: Nov. 7, 2007

(65) Prior Publication Data

US 2009/0118989 A1 May 7, 2009

(51) Int. Cl.
*G01M 15/12* (2006.01)
(52) U.S. Cl. .................... 73/35.09; 73/114.07
(58) Field of Classification Search .......... 73/35.01, 73/35.03, 35.06, 35.07, 35.09, 35.11, 114.02, 73/114.07
See application file for complete search history.

(56) References Cited

U.S. PATENT DOCUMENTS

| 4,465,047 | A | * | 8/1984 | Yamaguchi et al. ........ 73/35.09 |
| 6,112,169 | A | | 8/2000 | Dolson |
| 7,181,339 | B2 | | 2/2007 | Remelman |
| 2003/0005749 | A1 | * | 1/2003 | Nishimura ................. 73/35.01 |
| 2004/0148151 | A1 | | 7/2004 | Menter et al. |
| 2005/0273328 | A1 | | 12/2005 | Padhi et al. |
| 2006/0111899 | A1 | | 5/2006 | Padhi et al. |
| 2006/0112811 | A1 | | 6/2006 | Padhi et al. |

| 2007/0000306 | A1 | * | 1/2007 | Danet et al. ................. 73/35.04 |
| 2007/0214869 | A1 | * | 9/2007 | Kaneko et al. ............. 73/35.09 |
| 2009/0038384 | A1 | * | 2/2009 | Kaneko et al. ........... 73/114.07 |

FOREIGN PATENT DOCUMENTS

| JP | 60-162035 A | 8/1985 |
| JP | 2000-110652 S | 4/2000 |
| JP | 2005-299579 A | 10/2005 |
| KR | 10-2002-0093588 A | 12/2002 |

OTHER PUBLICATIONS

O. Boubal, Knock Detection in Automobile Engines, IEEE Instrumentation and Measurement Magazine, Sep. 2000, pp. 24-28.

(Continued)

*Primary Examiner*—Eric S McCall
(74) *Attorney, Agent, or Firm*—Hamilton & Terrile, LLP; Michael Rocco Cannatti

(57) ABSTRACT

In an automotive system (300), a knock detection scheme is provided for detecting knock events in an internal combustion engine that are sensed by a transducer structure, such as a non-intrusive acoustic accelerometer sensor (310) to generate sensor signal information which is processed by a signal processing structure (312, 316, 318, 326) which extracts digital signal parameters from the sensor signal information to identify a predetermined pitch frequency (330) and any short-term energy increase (328) in the digital signal information which in combination are used to provide a positive indication of engine knock behavior. When a short term Fourier transform (324) is used to extract the digital signal parameters, time frequency resolution may be improved by appropriately windowing the digital signal being transformed.

20 Claims, 9 Drawing Sheets

OTHER PUBLICATIONS

R. C. Maher, Fundamental Frequency Estimation of Musical Signals Using a Two-Way Mismatch Procedure, J. Accoust. Soc. Am. 95 (4), Apr. 1994, pp. 2254-2263.

R. Yu et al., Comparison of Different Time-Frequency Distributions in Pitch Detection, IEEE, ICICS-PCM, Dec. 15-18, 2003, pp. 817-821.

S. A. Abeysekera et al., An Investigation of Window Effects on the Frequency Estimation Using the Phase Vocoder, IEEE Transactions on Speech and Audio Processing, vol. 14, No. 4, Jul. 2006.

M. R. Portnoff, Time-Frequency Representation of Digital Signals and Systems Based on Short-Time Fourier Analysis, IEEE Transactions on Acoustics, Speech and Signal Processing, vol. ASSP-28, No. 1, Feb. 1980.

S. Carstens-Behrens et al., Fast Knock Detection Using Pattern Signals, IEEE International Conference on Acoustics, Speech and Signal Processing, 2001 Proceedings, May 7, 2001-May 11, 2001, pp. 3145-3148.

O. Boubal, Knock Detection in Automobile Engines, IEEE Instrumentation and Measurement Magazine, Sep. 2000, pp. 24-28.

R. C. Maher, Fundamental Frequency Estimation of Musical Signals Using a Two-Way Mismatch Procedure, J. Accoust. Soc. Am. 95 (4), Apr. 1994, pp. 2254-2263.

R. Yu et al., Comparison of Different Time-Frequency Distributions in Pitch Detection, IEEE, ICICS-PCM, Dec. 15-18, 2003, pp. 817-821.

S. A. Abeysekera et al., An Investigation of Window Effects on the Frequency Estimation Using the Phase Vocoder, IEEE Transactions on Speech and Audio Processing, vol. 14, No. 4, Jul. 2006.

R. K. Jurgen, Automotive Electronics Handbook, 1999, Sections 8.2-8.8.

M. R. Portnoff, Time-Frequency Representation of Digital Signals and Systems Based on Short-Time Fourier Analysis, IEEE Transactions on Acoustics, Speech and Signal Processing, vol. ASSP-28, No. 1, Feb. 1980.

P. P. Vaidyanathanm, Multirate Systems and Filter Banks, 1993, pp. 462-475.

S. Carstens-Behrens et al., Fast Knock Detection Using Pattern Signals, IEEE International Conference on Acoustics, Speech and Signal Processing, 2001 Proceedings, May 7, 2001-May 11, 2001, pp. 3145-3148.

PCT/US2008/077356 International Search Report and Written Opinion mailed Apr. 14, 2009.

* cited by examiner

KNOCK SIGNAL DETECTION IN AUTOMOTIVE SYSTEMS

BACKGROUND OF THE INVENTION

1. Field of the Invention

The present invention is directed in general to field of internal combustion engines. In one aspect, the present invention relates to a system and method for improving the combustion process in automotive systems by predicting knock signals.

2. Description of the Related Art

As gasoline supplies have decreased and become more costly, there is an increasing demand for efficient fuel consumption. In addition, concern about the environmental effects caused by combustion engines has increased demand for combustion engines with reduced engine emissions. While auto manufacturers have attempted to meet these demands by increasing the engine compression ratio, this can result in engine knocking, which is an undesirable mode of combustion which originates spontaneously and sporadically, causing increased pollution and damaging engine parts, as well as creating unpleasant metallic noises.

To increase fuel economy and reduce engine emissions, there have been attempts to sense or detect engine knocks, and then use the detected knock signals to control the engine combustion process. Typical automotive systems capture or detect a knock event using sensors, such as jerk sensors or piezoelectric or piezoceramic accelerometer sensors. For example, depending on the dimensions of the combustion chamber and on the sound velocity of the cylinder charge, in-cylinder pressure vibrations excite structure vibration pulses which can be measured by accelerometer sensors. The reverberation resonance of the cylinder lies typically between 2 kHz and 12 kHz. As will be appreciated, a rough estimate of the knock frequency for a given engine cylinder geometry is given by the following equation:

$$f_r = \frac{P_{mn} \cdot C}{\pi \cdot B} \quad (1)$$

where $f_r$ is the knock resonant frequency, $P_{mn}$ is the vibration mode constant, C is the velocity of sound in the gas in the cylinder and B is the radius of the cylinder.

An example of a conventional knock detection scheme 10 is shown in FIG. 1, which depicts the different blocks in a standard knock detection algorithm, including knock sensor 11, signal pre-processing 12, parameter extraction 13, and knock detection 14. At a detection stage 11, the knock sensors help detect the knock event. The knock sensor can be a non-intrusive sensor (e.g., a simple accelerometer) or an intrusive sensor (e.g., a piezoelectric ceramic that serves as a reference for measuring the knock energy released in the resonance frequencies of the combustion chamber). The detected signal is then processed in the signal processing stage 12 in either the digital or analog domain, and parameters (such as pressure or vibration) are extracted in the extraction stage 13. There are several methods for extracting the energy of the resonance frequencies generated by engine knocks, including time-series processes, frequency processes, and time-frequency distribution (TFD) techniques for transforming uni-dimensional signals into a bi-dimensional representation as a function of time and frequency. For example, the most widely used TFD is the Short Time Fourier Transform (STFT), and researchers have also developed time-frequency distributions, such as the smoothed version of the Wigner-Ville distribution, and adapted it to the study of knock pressure signals. The representation of a signal with knock using such distributions shows both the non-stationary character of the signal, as well as the dependence of the resonance frequency values with respect to time.

As will be appreciated, there are different challenges posed to accurately detecting knock signals at the knock detection stage 14, depending on the type of sensor used and on how the parameter extraction stage is implemented. For example, magnetostrictive jerk sensors are effective in detecting knock signals, but they often have too many components to be cost-effective. On the other hand, a simple accelerometer attached directly to the head gasket or engine block can measure the intensity of the vibrations induced in the combustion chamber by engine knocking, thereby providing localized information for each cylinder. Though they are non-intrusive and easy to use, accelerometer sensors are sensitive to engine vibrations and shocks from metallic parts of the engine.

Errors can also be introduced in the parameter extraction stage. For example, one drawback associated with Short Time Fourier Transform (STFT) extraction is that the amplitude smearing effect prevents the instantaneous frequency parameter from being correctly estimated. To illustrate this problem, FIGS. 2 and 3 depict two different amplitude response measurements for a signal frequency where the y-axis is in the logarithmic scale. In FIG. 2, the amplitude response 21 is for a sinusoidal signal frequency that coincides with one of the bin frequencies of the STFT, in which case the original amplitude is retained after the STFT. However, FIG. 3 depicts the amplitude response 22 of a sinusoidal signal frequency that lies in between two adjacent bin frequencies of the STFT, in which case the energy is spread over the entire spectrum. As a consequence of the amplitude smearing effect, the detected amplitude is lower in the case. This is illustrated in FIGS. 4 and 5 which depict two different amplitude response measurements for a signal frequency where the y-axis is in the linear scale. In FIG. 4, the amplitude response 23 (approximately 510) is shown for a sinusoidal signal frequency that coincides with one of the bin frequencies of the STFT, while FIG. 5 shows that the detected amplitude response 24 (approximately 435) is lower when the peak frequency lies in between two adjacent frequency bins. In contrast to STFT schemes, complex time-frequency distributions (e.g., Wigner-Ville distributions) are computationally intensive, and can produce confusing artifacts in the case of multi-component signals which lead to errors in pitch detection.

As seen from the foregoing, conventional approaches for detecting engine knocking in combustion engines are unduly complex, expensive and unreliable. In addition, such systems do not accurately measure the signal frequency due to sensitivity to extraneous signals (such as engine vibrations and shocks) and because of amplitude smearing effects caused by conventional STFT extraction schemes. Accordingly, there is a need for an improved system and methodology for detecting knock signals in an internal combustion engine. There is also a need for an engine knock detection scheme which provides a way to accurately measure and detect engine knock events so that engine control algorithms can minimize its undesirable effects scheme. In addition, there is a need for a knock detection system and methodology which overcomes the problems in the art, such as outlined above. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description of a preferred embodiment is considered in conjunction with the following drawings, in which.

Figure 1:
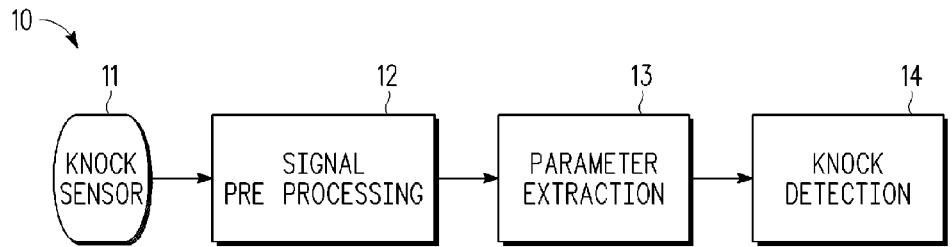
FIG. 1 depicts in block diagram form the stages in a conventional knock detection process.
Figure 2:
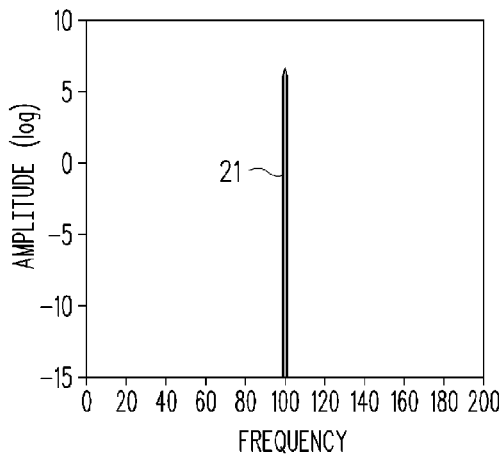
FIGS. 2 and 3 depict two different amplitude response measurements for a signal frequency where the y-axis is in the logarithmic scale.
Figure 3:
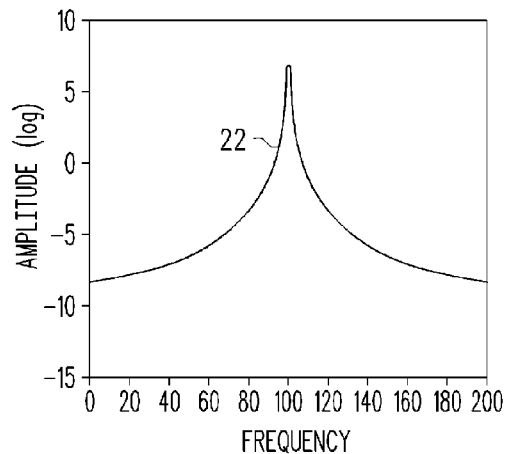
Figure 4:
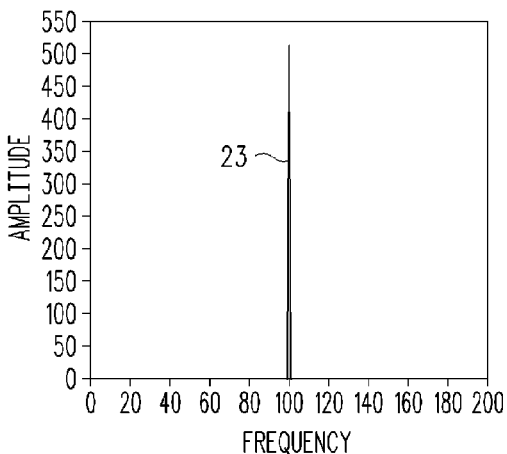
FIGS. 4 and 5 depict two different amplitude response measurements for a signal frequency where the y-axis is in the linear scale.
Figure 5:
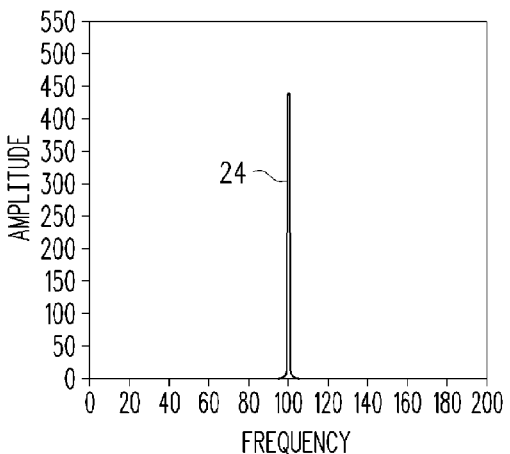

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding. Further, where considered appropriate, reference numerals have been repeated among the drawings to represent corresponding or analogous elements.

DETAILED DESCRIPTION

An engine knock signal processing system and methodology are described for use in efficiently and accurately detecting knock events in an internal combustion engine. Using non-intrusive sensors (such as accelerometers) to detect engine knock signals, the intensity of vibrations induced in the combustion chamber by knock events can be measured. After lowpass filtering, the measured vibration signal is converted from analog to digital form, allowing digital processing techniques to be applied to extract parameters for detecting the presence of knock events in the signal. Parameters are then extracted by applying an anti-aliasing filter, decimating the filtered signal (e.g., by a factor D) and using a time-frequency technique (such as STFT) to transform the decimated filtered signal into a bi-dimensional representation as a function of time and frequency. By decimating the filtered signal to reduce its sampling frequency, the computational load on the processor is reduced as the STFT is computed at a lower frequency. In addition, the frequency resolution of the STFT can be enhanced by choosing the appropriate windowing function for the STFT which minimizes the spectral leakage and enhances the primary frequencies. Based on the frequency components detected in the signal, the fundamental frequency of the signal is computed. Once the relevant parameters are extracted, the presence of a pitch frequency and any increase in the short term energy of the signal are detected to indicate the presence of a knock event in the signal. By combining pitch detection with energy-based knock detection, a more accurate knock detection algorithm is provided which has fewer "false" knock detections that would be generated with a purely energy-based algorithms.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. Various illustrative embodiments of the present invention will now be described in detail below with reference to the figures.

Figure 6:
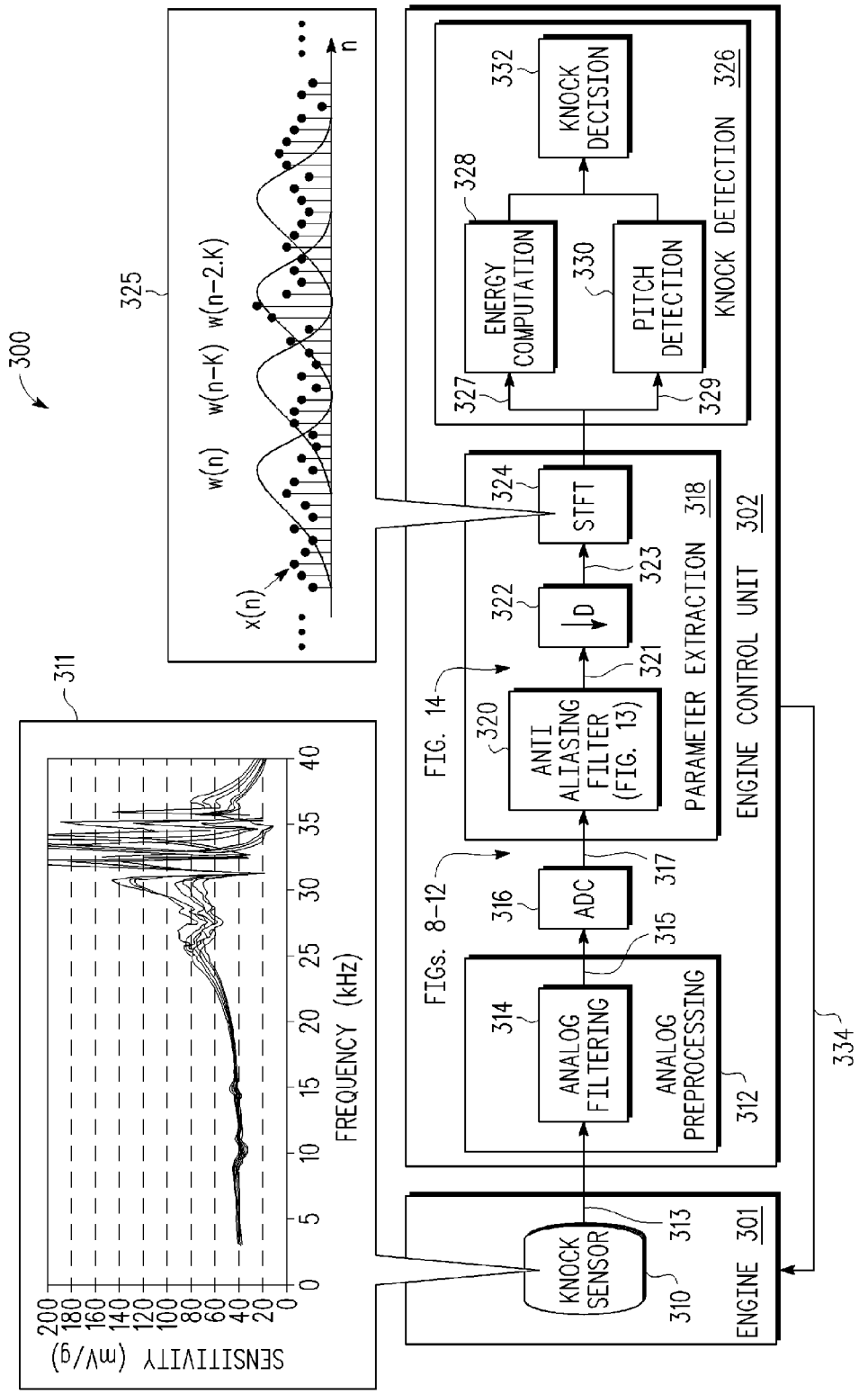
FIG. 6 depicts in block diagram form an automotive system in which a knock detection scheme is implemented in accordance with selected embodiments of the present invention.

FIG. 6 depicts in block diagram form an automotive system 300 in which a knock detection scheme is implemented in accordance with selected embodiments of the present invention. In the depicted example, the automotive system 300 includes an engine 301 and an engine control unit (ECU) 302 which feeds back control signals 334 to control the operation of the engine 301. This control signals 334 are used to adjust the operation of engine 301 so as at least to minimize, if not completely eliminate, knock behavior. The natures of such adjustments are well known by those skilled in the art.

Operatively coupled to the engine 301 is a transducer structure which includes at least one (for one cylinder) knock sensor 310 located in the engine. The transducer structure is operatively coupled to a signal processing structure which may be implemented as part of or separately from the ECU 302 to detect, sense and measure vibrations induced in the combustion chamber by knock events in the engine. In the ECU 302, the vibration signal is processed with a signal pre-processing stage 312, a parameter extraction stage 318 and a knock detection stage 326 which combine to detect a predetermined pitch frequency and to any short-term energy increase which together signify the presence of an engine knock event. As will be appreciated, any one or more of these stages may be implemented with dedicated hardware circuits and/or processing units that are controlled by software or other control logic.

In selected embodiments, the knock sensor may be implemented as an accelerometer sensor that is attached directly to the head gasket or engine block (not shown) in the engine 301, thereby providing a cost-effective vibration sensor. Of course, other sensors may be used, such as jerk sensors or piezoelectric or piezoceramic accelerometers. In response to sensing or measuring vibrations in the engine cylinder, the knock sensor 310 generates a sensor data signal 313. FIG. 6 depicts a typical knock sensor response 311 for a Siemens sensor, though other sensors may also be used, such as Bosch sensors. As seen from the plot of the signal response 311 included in FIG. 6, the sensor response 311 typically contains high frequency signal response components (e.g., over 30 kHz) that provide only a rough indication of a knock event and that that should be filtered out to prevent aliasing effects into the lower frequency bands.

To remove the noisy high frequency signal response components from the sensor data signal 313, the analog pre-processing module 312 may apply a lowpass analog filter 314 to the sensor data signal 313. In an example implementation, the analog filter 314 eliminates signal frequency components over 25 kHz from the sensor data signal 313. This analog filtering step removes noisy high frequency components, thereby generating a pre-processed or lowpass filtered signal 315. As will be appreciated, other analog pre-processing steps may be performed on the sensor data signal 313 in the analog pre-preprocessing stage 312.

To digitize the sensor data, an analog-to-digital converter (ADC) 316 samples the lowpass filtered signal 315 into a digitized signal 317. This may be done by converting the input data signal 315 into digital samples that are divided into frames. In an example embodiment, the ADC 316 samples the input data signal 315 at 100 kHz into data frames, each frame having 256 samples. It will be appreciated that other sampling rates and frame sizes may be used, where the frame size is a tradeoff between higher time or frequency resolution. By digitizing the pre-processing signal 315, digital processing techniques may be applied to extract parameters for detecting the presence of knock events in the digitized signal 317.

In various embodiments, one or more of the ADC 316, anti-aliasing filter 320 and decimator 322 may be implemented with discrete and separately programmable hardware circuits. Alternatively, one or more of these units may be integrated into a single enhanced digital sampling unit which integrates a programmable ADC and anti-aliasing decimator filter capable to taking in ADC conversion results at a high rate, passing them through a hardware low pass filter, then down-sampling the output of the filter and feeding the lower sample rate results to the result FIFOs. This allows the ADCs to sample the sensor at a rate high enough to avoid aliasing of out-of-band noise, while providing a reduced sample rate output to minimize the amount DSP processing bandwidth required to fully process the digitized waveform.

Figure 8:
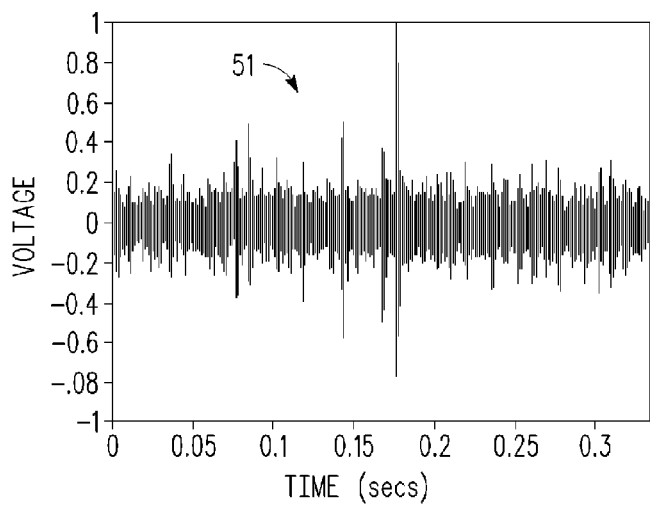
FIGS. 8-10 depict digitized sensor data measurements in the time domain for different types of engine operation conditions.
Figure 9:
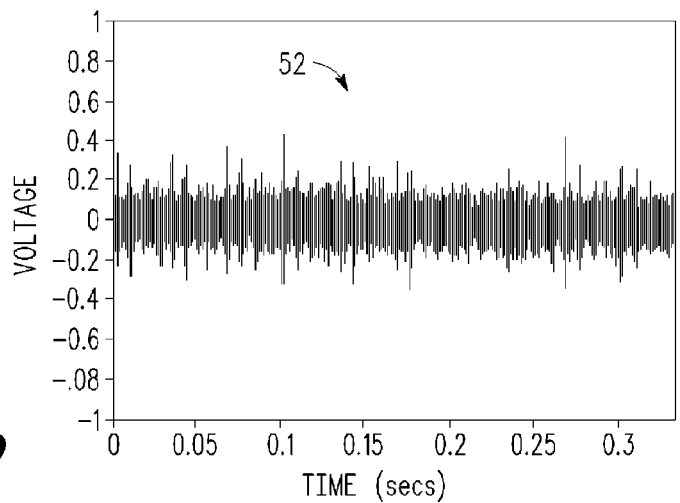
Figure 10:
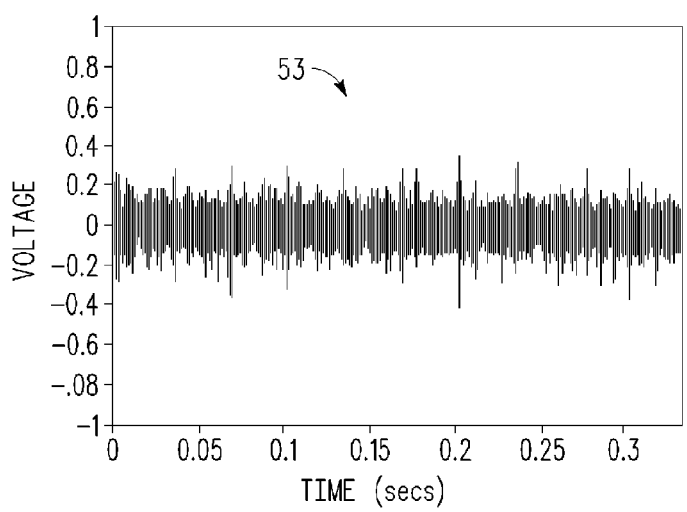
Figure 11:
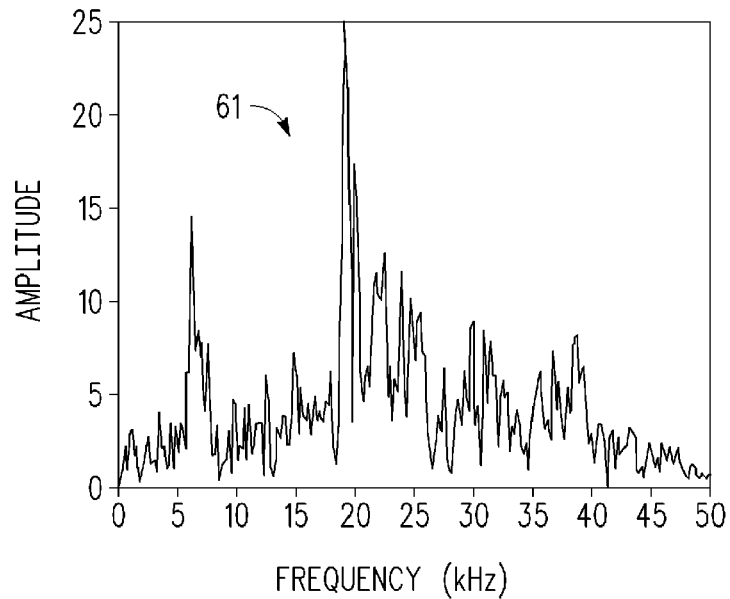
FIGS. 11 and 12 depict digitized frequency spectrum measurements for sensor data after low-pass analog filtering (a) with knock and (b) without knock.
Figure 12:
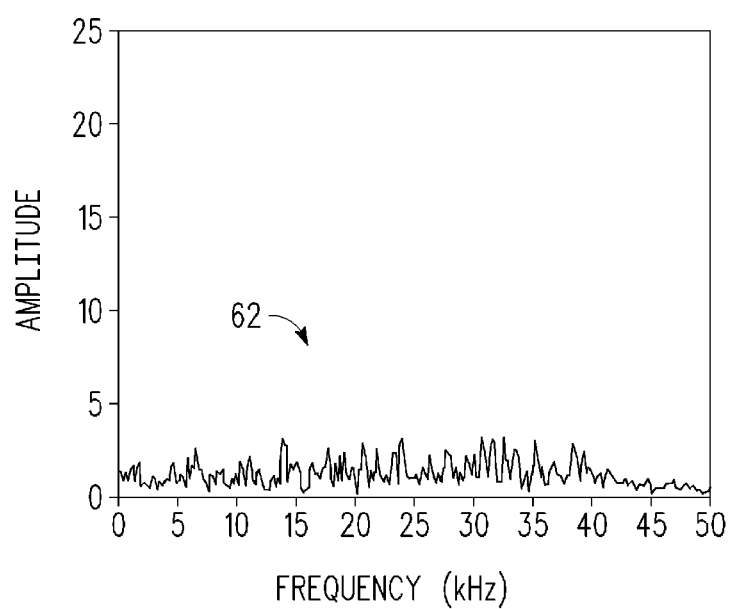

Examples of digitized sensor data signals 317 are depicted in FIGS. 8-10, which shows sensor data in the time domain for different types of engine operation conditions. First, FIG. 8 shows the digitized sensor data 51 in the presence of knock at 0.175 seconds when the engine is fired early. At FIG. 9, the digitized sensor data 52 shows that there is no sudden change in the energy of the signal in the case of late firing. Finally, FIG. 10 shows the digitized sensor data 53 where there is no sudden change in the energy of the signal in the case of normal firing of the engine. In each of these examples, the measurements were taken from an engine operating at 3600 rpm and sampled at 100 kHz. As these measurements show, vibrations in the engine cylinder increase due to the presence of knock events. These vibrations from knock events also increase the short term energy levels by creating harmonics of the cylinder's resonant frequency, as shown in FIGS. 11 and 12, which depict frequency spectrum measurements for sensor data after low-pass analog filtering (a) with knock and (b) without knock. When a knock event is present—as shown in the digitized sensor data 61 of FIG. 11—the cylinder's resonant and harmonic frequencies appear as energy pulses at 7 kHz and higher harmonic frequencies. However, when there is no knock event present—as shown in the digitized sensor data 62 of FIG. 12—there are no energy pulse spikes at the harmonic and resonant frequencies.

While described herein with reference to digitizing single sensor data signal 315, the ADC 316 may be implemented as a multi-channel or enhanced queued ADC so as to simultaneously handle the sampling of multiple knock sensor data signals from multiple cylinders. By providing the ADC 316 with the ability to receive and independently process data from separate sources in separate queues or channels, sensor data from different cylinders can be sampled in parallel. To allow the direct connection of the ADC 316 to high impedance acoustic knock sensors, the ADC 316 may include differential inputs; integrated variable gain amplifiers for increasing the dynamic range; and programmable pull-up and pull-down resistors for biasing and sensor diagnostics.

Figure 13:
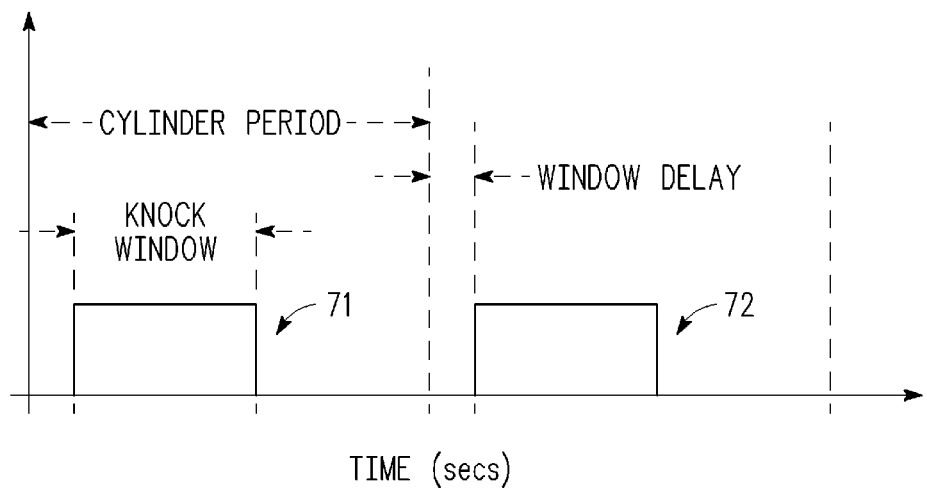
FIG. 13 illustrates in timing diagram form the knock windows used to control the digital sampling of the sensor data into knock data segments.
Figure 14:
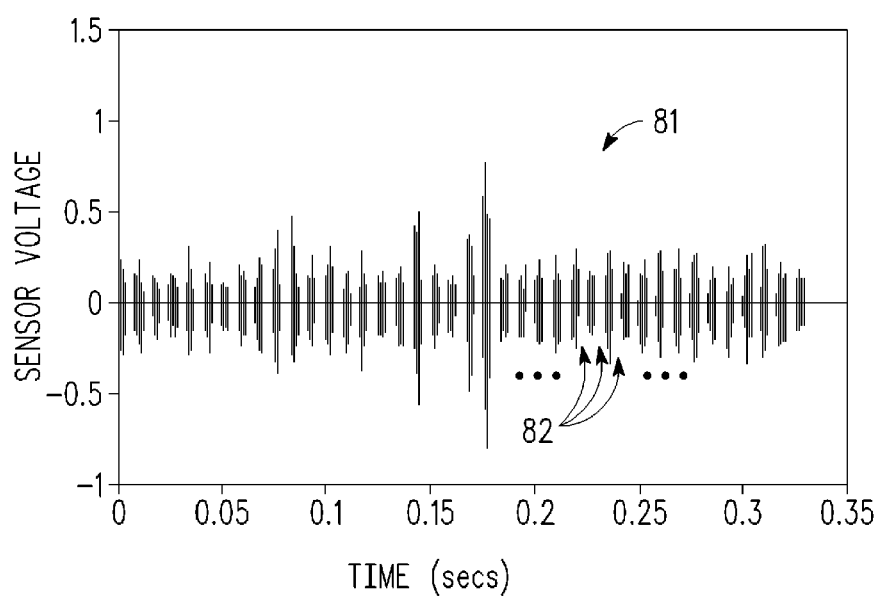
FIG. 14 depicts the digitally sampled sensor data measurements after removal of non-windowed components.

In selected embodiments, extraneous information may be removed from the sensor data 315 by controlling the sampling operation of the ADC 316 so that the sampling occurs only during predetermined sampling or knock windows. The result is that the ADC 316 samples the analog sensor data 315 only within the knock window, and otherwise no sampling output is generated. A knock window 71 (or sequence thereof 71, 72, etc.) may be defined with reference to knock window parameters which specify a window delay value, a window duration value, a window end value and/or a window period value. These parameters are illustrated in FIG. 13, which shows in timing diagram form the parameter values for the knock windows 71, 72 used to extract the knock data segment information. In operation, the data from the sensor is buffered during each knock window, while the non-windowed components are removed. The resulting ADC output is shown in FIG. 14 which depicts the knock sensor data measurements 81 after removal of non-windowed components 82. To account for changing engine conditions, the knock window parameters may be adjusted correspondingly. Table 1 provides an example listing of different knock window parameters that can be used to control the ADC 316 at different revolutions per minute (RPM) for a 4 cylinder GM engine sampled at 100 kHz.

TABLE 1

Knock Window Parameters

| RPM | Window Delay (sec) | Window Duration (sec) | Window End (sec) | Window Period (sec) |
|---|---|---|---|---|
| 1200 | 2.64E−03 | 5.15E−03 | 7.79E−03 | 2.50E−02 |
| 2400 | 1.18E−03 | 3.85E−03 | 5.03E−03 | 1.25E−02 |
| 3600 | 5.56E−04 | 3.40E−03 | 3.96E−03 | 8.33E−03 |
| 4400 | 4.55E−04 | 3.00E−03 | 3.45E−03 | 6.82E−03 |
| 6000 | 3.33E−04 | 3.00E−03 | 3.33E−03 | 5.00E−03 |

Once the digitized signal 317 is generated by the ADC 316, it may be processed in a parameter extraction module 318 to extract parameter information. In selected embodiments, the parameter information is extracted by applying an anti-aliasing filter 320, decimating the filtered signal with a decimator 322, and then using time-frequency distribution techniques to transform the decimated filtered signal into a bi-dimensional representation as a function of amplitude and frequency. In various embodiments, the transformation is implemented with an STFT module 324 which correctly estimates the instantaneous frequency and amplitude of the detected signal by choosing a window for the input signal which enhances the primary frequencies.

Figure 15:
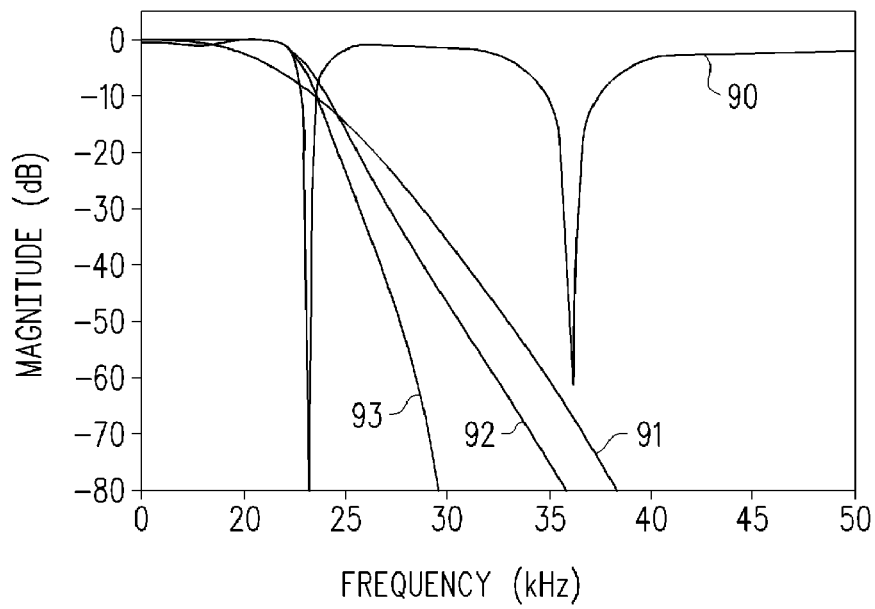
FIG. 15 illustrates the frequency responses of four different IIR filters which may be used for an anti-aliasing filter in accordance with selected embodiments of the present invention.
Figure 16:
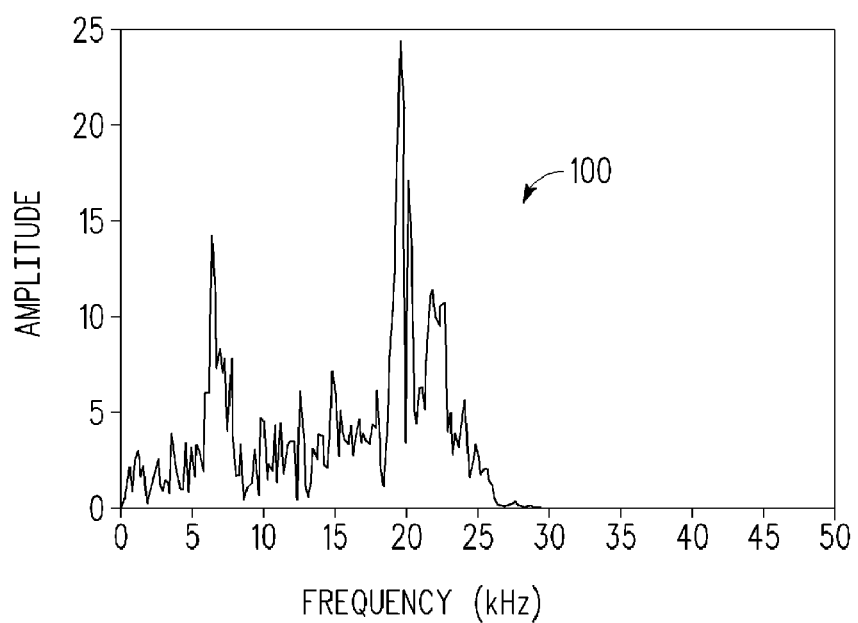
FIG. 16 depicts the frequency response of a digitally filtered knock signal.

The function of the anti-aliasing filter 320 is to remove the high frequency components from the input data 317, and as such, can be implemented with any desired digital filter configuration. In selected embodiments, a fourth order elliptical IIR filter is chosen as the anti-aliasing filter because it has a sharp roll-off and minimizes the energy in the stop-band frequencies of the filter. FIG. 15 illustrates the frequency responses of four different fourth order IIR filters having a cutoff frequency of 22 kHz which may be used for an anti-aliasing filter 320. In particular, the frequency response 90 depicts a Butterworth IIR filter, the frequency response 91 depicts an elliptical IIR filter, the frequency response 92 depicts a Chebyshev 1 IIR filter, and frequency response 93 depicts a Chebyshev 2 IIR filter. Of the depicted examples, the elliptical filter response 93 has the best combination of sharp roll-off and minimal stop-gap band energy, followed by the Chebyshev 1 filter, the Butterworth filter and the Chebyshev 2 filter, in order. In terms of the filtering result, the anti-aliasing filter 320 operates to pass frequency components below 20 kHz from the sensor data signal 317 and to block frequency components above 30 kHz from the sensor data signal 317. Though the IIR filter 320 alters the phase information of the knock signal 317, this is not critical to the operation of the disclosed knock detection scheme. The result of applying the anti-aliasing filter 320 is illustrated in FIG. 16 which depicts the frequency response 100 of a filtered knock signal 321 to show that the high frequency noise components are eliminated from the filtered knock signal 321, as compared to the frequency components from the unfiltered knock signal 317 depicted in FIG. 11.

At the decimator 322, the sampling frequency of the input sampled digital signal 317 is reduced by a factor D to produce a decimated signal 323 having a reduced sampling frequency as compared to the input digital signal 317. While any desired decimation factor D may be used, in an example embodiment, the input sampled digital signal 317 is decimated from 100 kHz to 50 kHz by dropping samples. By reducing the frequency of the input sampled digital signal 317, the computational load on the processor is reduced by allowing the subsequent STFT computation to be performed at a lower frequency.

The final step in extracting the parameter information is performed by the STFT module 324 which transforms the decimated signal 323 to determine the sinusoidal frequency and amplitude content of local sections of a signal as it changes over time. In the discrete time case, the data signal 323 to be transformed is effectively broken up into chunks or frames which may overlap with one another. Each chunk is Fourier transformed, and the complex result is added to a matrix, which records magnitude and phase for each point in time and frequency. In particular and as illustrated with the STFT waveform 325 depicted in FIG. 6, the input signal x(n) (representing the decimated input signal 323) is multiplied with a window w(n), which is typically finite in duration. The Fourier transform of the product x(n)·w(n) is computed, and then the window w(n) is shifted in time, and the Fourier transform of the product is computed again. This operation results in separate Fourier transforms for each location m of the center of the window. In other words, the STFT module 324 computes a function $X_{STFT}(e^{j\omega}, m)$ of two variables $\omega$ and m. The frequency variable $\omega$ is continuous, and takes the usual range $-\pi \leq \omega < \pi$. The shift variable m is typically an integer multiple of some fixed integer K (i.e., m can take values of $\{\ldots, -2K, -K, 0, K, 2K, \ldots\}$).

In effect, for any fixed m, the window captures the features of the input signal x(n) 323 in the local region around m. The window therefore helps to localize the time domain data before obtaining the frequency domain information. From the above discussion, the Short-Time Fourier Transformation can be mathematically written to be:

$$X_{STFT}(e^{j\omega}, m) = \sum_{n=-\infty}^{\infty} x(n) \cdot w(n-m) \cdot e^{-j\omega n} \quad (2)$$

If w(n)=1 for all n, the above expression reduces to the traditional Fourier transformation for any choice of m. From its definition, the STFT module 324 can be treated as a filter bank with infinite number of filters. For every frequency $\omega_0$, the STFT module 324 performs a filtering operation (e.g., a filtering operation for every frequency bin in the Fourier Transform). In accordance with selected embodiments where the Fourier transform is computed for only a discrete set of frequencies $\{0<\omega_0<\omega_1<\ldots<\omega_{M-1}<2\pi\}$, the functionality of the STFT module 324 is reduced to a filterbank with M bandpass filters.

Figure 17:
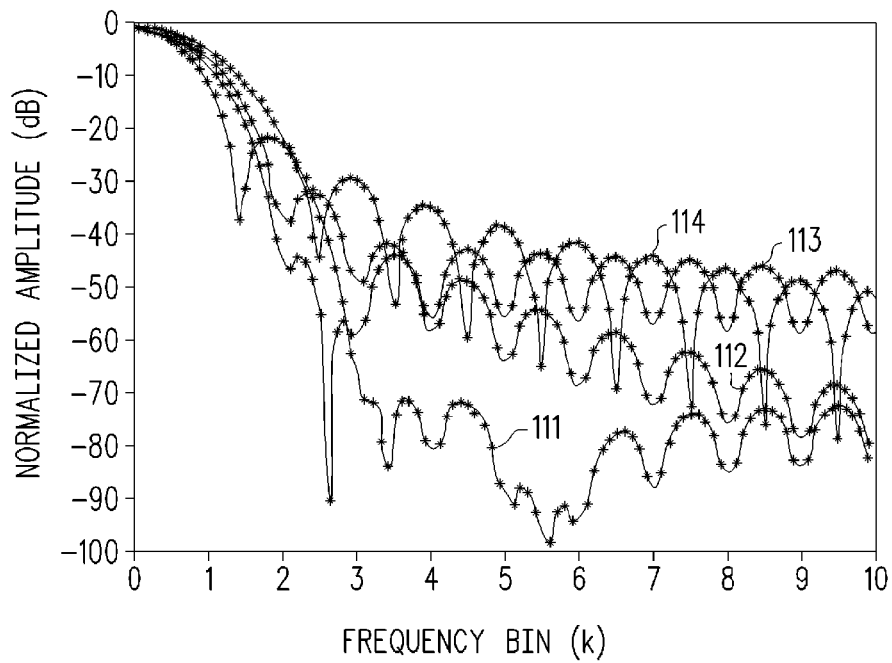
FIG. 17 illustrates the normalized spectrum for different windows which may be used for the STFT module.

Unlike the Fourier transform, the STFT is not uniquely defined unless the window w(n) is specified. In fact, the choice of the window governs the tradeoff between "time localization" and "frequency resolution." The larger the number of time domain samples windowed, the better is the frequency resolution. However, this implies that the time at which an "event" occurs is lost. On the other hand, if the window size decreases, the time localization of events in the signal is better, but the frequency resolution of the signal (i.e., k/N) is poorer as N becomes smaller. Depending on the given frequency resolution, a desired time localization can be achieved, and vice versa through the use of suitable windows. To achieve accurate knock signal detection, the windowing function in the STFT module 324 should be chosen carefully to enhance the frequency resolution of the STFT by reducing the effect of frequency smearing. In accordance with selected embodiments, the windowing function is selected which minimizes the sidelobe energy levels and the ratio $W(f_0-f_1)/W(0)$. FIG. 17 illustrates the normalized spectrum of four different windows which may be used for the STFT module 324. In particular, the frequency response 111 depicts a Blackman Harris window, the frequency response 112 depicts a Hanning window, the frequency response 113 depicts a Hamming window, and frequency response 114 depicts a parabolic window. Of the depicted examples, the Blackman Harris window 111 has the best combination of sharp roll-off and minimal stop-gap band energy over most frequency ranges, followed by the Hanning window, the Hamming window and the parabolic window, in order. As can be observed, the error performance will depend on the frequency range and position of the second sinusoid.

In the knock detection module 326, the extracted parameters are used to detect a predetermined pitch frequency (block 330) and to detect any short-term energy increase (block 328). If both are present in the signal, a knock signal is detected (block 332). On the other hand, if only one of the conditions is detected, there is no knock signal detected. For example, in cases where the engine is subject to sudden vibrations (such as can be caused by driving over a pothole or railroad tracks), the accelerometer sensor would detect higher energy levels across all frequencies, but the resonant pitch frequency would not be detected. In these cases, the knock detection module 326 would not return a knock event, while a purely energy-based detection scheme would have falsely detected a knock signal.

To implement the dual condition knock detection module 326, an energy computation module 328 is provided which uses the extracted frequency and amplitude information 327 to compute a short-term energy value in the time domain which is the amount of energy in a signal x(n), within a specific duration in time and is defined in Equation 3:

$$E_l = \sum_{n=(l-1)\cdot N+1}^{l\cdot N} x(n)^2 \qquad 3$$

where $E_l$ is the energy in the $l^{th}$ analysis frame of N samples. In other embodiments, the energy may be computed in the frequency domain. In addition or in the alternative, other energy-related values may be computed, such as the average frame energy which is determined by combining and averaging the short-term energy value with a predetermined number of short-term energy values from previous frames. As described below, the short-term energy value or values of the filtered and downsampled signal are used to detect the presence of knock in the signal by determining if there has been an increase in the short-term energy values.

The knock detection module 326 also includes a pitch detection module 330 which uses the extracted frequency and amplitude information 329 to compute the fundamental frequency of the detected signal. For each frame, this is done by choosing the critical frequencies from the output of the STFT module 324 and comparing the amplitude at each bin with its neighboring bins. These peaks in the amplitude spectrum are referred to as partials. The most likely fundamental frequencies are chosen from the critical frequencies based on the greatest common divisor of maximum number of partials in the signal spectrum. To compare the amplitude at each bin with its neighboring bins, a two-way mismatch error calculation process is used. This error calculation is a two-step process in which each measured partial is first compared to the nearest predicted harmonic to give the measured-to-predicted error ($Err_{p \to m}$). Second, each predicted harmonic is compared to the nearest measured partial to give the predicted-to-measured error ($Err_{m \to p}$). As shown in Equation [4], the total error ($Err_{total}$) is a weighted combination of these two errors:

$$Err_{total} = \qquad (4)$$

$$\frac{Err_{p \to m}}{N} + \rho \cdot \frac{Err_{m \to p}}{K} = \frac{1}{N} \sum_{n=1}^{N} \left[ \frac{\Delta f_n}{f_n^p} + \frac{a_n}{A_{max}} \cdot \left\{ q \cdot \frac{\Delta f_n}{f_n^p} - r \right\} \right] +$$

$$\rho \cdot \frac{1}{K} \sum_{k=1}^{K} \left[ \frac{\Delta f_k}{f_k^p} + \frac{a_k}{A_{max}} \cdot \left\{ q \cdot \frac{\Delta f_k}{f_k^p} - r \right\} \right]$$

where, N is the number of harmonics of the trial fundamental frequency ($f_{fund}$) given by $N=\lfloor f_{max}/f_{fund} \rfloor$; the $\lfloor x \rfloor$ operation returns the smallest integer greater than x; $f_{max}$ is the highest frequency; $A_{max}$ is the maximum amplitude of the measured partials; and K is the total number of partials (i.e. critical frequencies in each frame). As seen from Equation 4, the total error ($Err_{total}$) is normalized by the fundamental frequency, and incorporates factors that take into account the effect of amplitudes of the partials, such as the Signal to Noise Ratio (SNR) on the pitch of the signal. As the error is a function of the frequency difference ($\Delta f_n = \Delta f_n = |f_n - f_k|$) between the measured partial and the nearest harmonic frequency, the maximum error occurs when there are missing harmonics or when the ratio of the amplitudes is small. Similarly, the minimum error will occur when most of the harmonics of the trial frequency are present and the ratio of the amplitudes is large. For example, the values p=0.5, q=1.4 and r=0.5 satisfy the above weighting properties. The frequency which produces a minimum in the mismatch error is the pitch of the signal. If the two-way mismatch error is higher than 3, then no pitch is detected.

The knock detection module 326 also includes a knock decision module 332 which combines the outputs from the energy computation module 328 and the pitch detection module 330 to detect knock events. While implemented logically as a logical AND gate function, any desired comparison circuit or methodology may be used. For example, the rising edges of the short-time energy of the input signal may be used to detect short-term energy increases in the input signal by calculating the energy estimate over 128 samples (at 50 kHz) using Blackmann Harris windows with an overlap of 50%, and using a rising edge detector to implement a simple predictor that looks at the present frame's energy estimate and compares it to the previous frame's energy. If the current energy is larger than the previous frame energy by a predetermined factor, the frame is identified as possibly qualifying as an engine knock. To provide an example implementation, if the current energy is two times larger than the average of the previous short-time energies and three times larger than the previous frame energy, then this frame may be treated as a candidate for being a knock. Similarly, the knock decision module 332 includes detection control logic or circuitry to detect the presence of pitch frequencies in the 5-10 kHz range which signals the presence of a knock event in the signal. When both conditions are satisfied (namely, the presence of a pitch frequency as well as an increase in the short term energy of the signal), the knock decision module 332 predicts that the frame includes a knock event.

While various different kinds of readily available signal-processing and handling structures may be employed to make up the contents of signal processing structure described herein, one arrangement which has been found to work extremely satisfactorily takes the form of a combination of a multi-channel data-acquisition module made by Freescale and sold as JPC563M60 Microcontroller. Analog signals coming from a knock sensor are fed into structure through appropriate analog inputs, following which, such signals are analog low-pass filtered (block 312), digitized with a delta-sigma ADC converter (block 316), anti-alias filtered (block 320) and decimated (block 322) before flowing to a bus structure for communication with STFT module (324).

Figure 7:
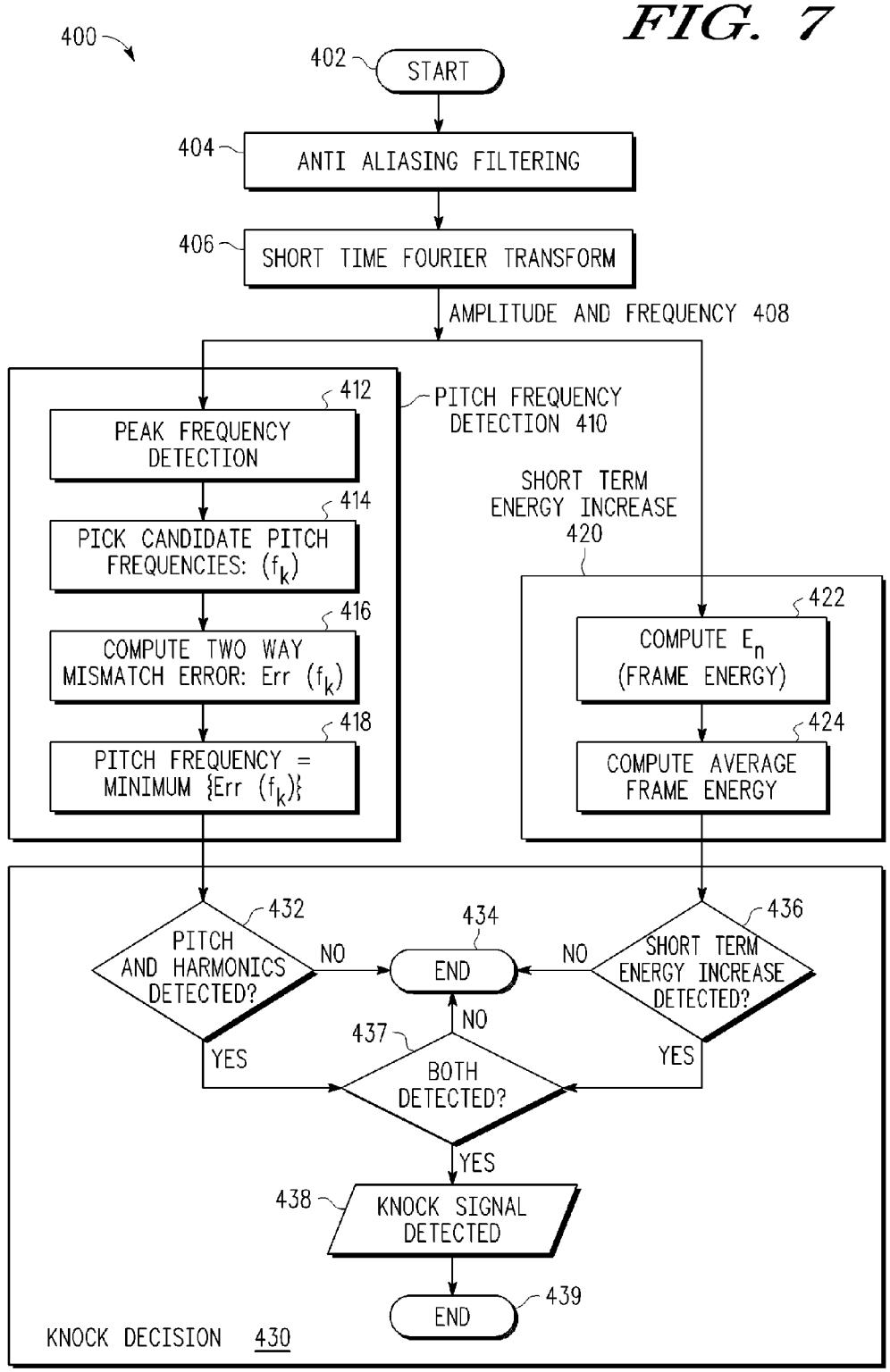
FIG. 7 depicts an example flow sequence for detecting engine knocks in accordance with selected embodiments of the present invention.

Selected embodiments of the present invention may also be illustrated with reference to FIG. 7, which depicts an example flow sequence 400 for detecting engine knocks in accordance with selected embodiments of the present invention. As depicted, the process starts (step 402) when the knock sensor detects or measures vibrations in the engine cylinder, thereby generating an analog signal. After digitizing the input analog signal and lowpass filtering the digital signal (e.g., with an anti-alias filter) to remove the high frequency components from the input data (step 404), a Short Time Fourier Transform (STFT) is applied (step 406) to extract amplitude and frequency information 408. As described above, the windowing function in the STFT should be chosen carefully to enhance the frequency resolution of the STFT, and in a selected embodiment, a Blackman Harris window is used in the SFTF step 406.

Based on the frequency and amplitude information 408 extracted from the input data signal, the fundamental frequency of the signal is computed at step 410 and the short-term energy of the signal is also computed (step 420). The presence of a pitch frequency as well as an increase in the short term energy of the signal indicates the presence of a knock event in the signal (step 430).

The pitch frequency detection step 410 may be implemented by first detecting the peak frequency using the extracted frequency and amplitude information 408 (step 412). Next, the candidate or predicted pitch frequencies ($f_k$) are chosen (step 414). The candidate frequencies are chosen from the critical frequencies based on the greatest common divisor of maximum number of partials in the signal spectrum. Using a two-way mismatch error computation Err ($f_k$) (at step 416), the peak frequency is compared to the candidate pitch frequencies, and the candidate pitch frequency which minimizes the error function Err ($f_k$) is selected as the pitch frequency (step 418).

Figure 18:
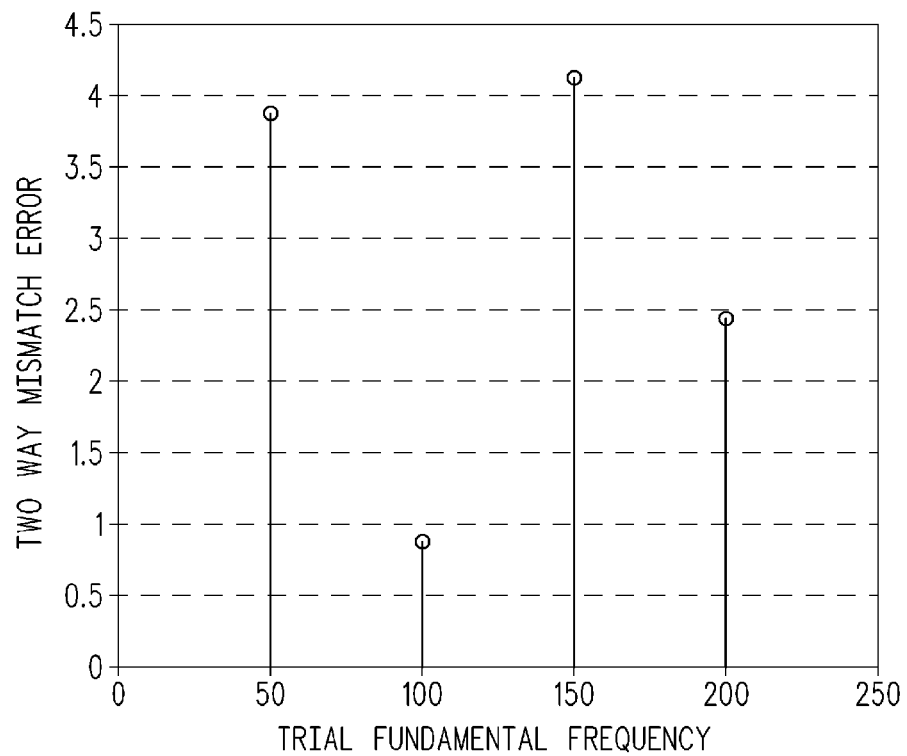
FIG. 18 plots the mismatch error for different fundamental frequencies.

To demonstrate how the pitch frequency is detected at step 410, consider the example a test signal that is applied to the knock sensor containing the series of sinusoids {100, 200, 300, 500, 600, 700, 800} Hz. For a trial fundamental frequency $f_{fund}$=50 Hz, all the partials are harmonics, but the harmonics at {50, 150, 250, 350, 400, 450, 550} Hz are missing. In contrast, for a trial fundamental frequency $f_{fund}$=100 Hz, only the harmonic at {400} Hz is missing. If the same analysis is applied to the other trial fundamental frequencies (150, 200, 250 Hz) and quantified in the form of computing the mismatch error using Equation [4], the results may be plotted as shown in FIG. 18. As the minimum mismatch error is for a trial fundamental frequency of 100 Hz, it is the fundamental frequency of the given set of partials. This shows that the pitch detection algorithm is able to successfully detect the fundamental frequency present in a given set of frequencies. In selected embodiments, a predetermined hard cut-off value (e.g., 3.0) may be used to select the pitch frequency from the trial fundamental frequencies, so that any trial fundamental frequency having a mismatch error exceeding the predetermined hard cut-off value will be disqualified from selection as the pitch frequency. By constraining the mismatch error, the algorithm ensures that spurious fundamental frequencies are not detected. By constraining the range of the trial fundamental frequencies, the algorithm is efficient as well as more accurate in determining the presence of knock events in the input signal.

As for the short term energy computation step 420, it may be implemented by first computing the frame energy $E_n$ using the extracted frequency and amplitude information 408 (step 422). As described above, the frame energy may be calculated in either the time or frequency domain to determine the amount of energy in a detected signal 323 during a frame using Equation [3] to accumulate the signal energy for the samples taken within the frame. Next, the average frame energy is computed (step 424), such as combining and averaging the short-term frame energy value $E_n$ with a predetermined number of short-term energy values from previous frames.

Figure 19:
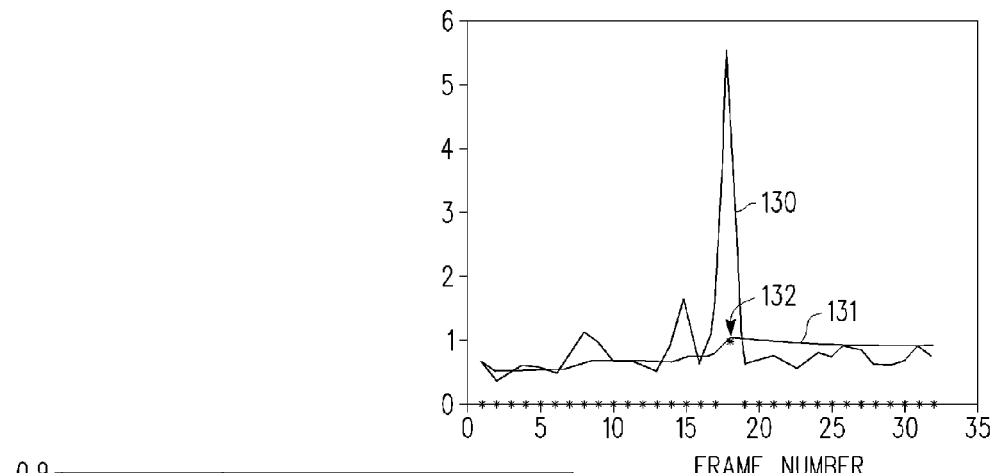
FIGS. 19-21 depict average frame energy measurements for different types of knock events.
Figure 20:
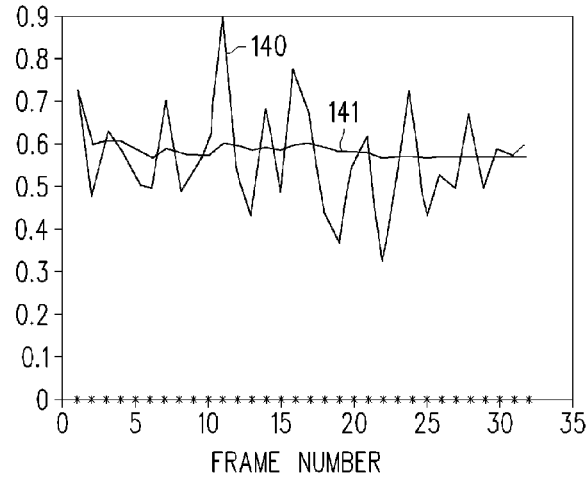
Figure 21:
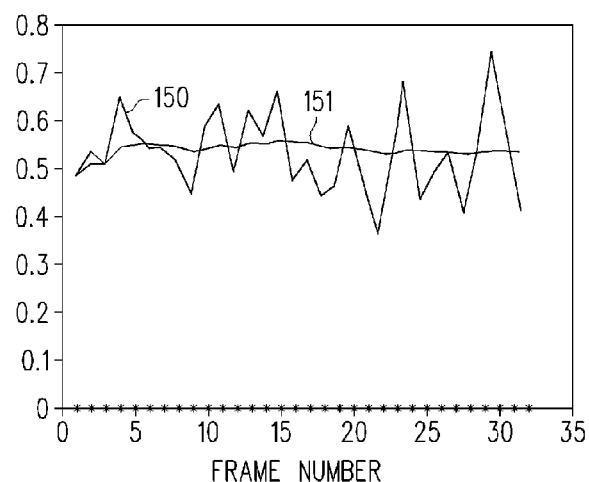

To demonstrate how the frame energy increases are detected at step 436, consider the example test signals depicted in FIGS. 19-21 which depict average frame energy measurements for different types of knock events. In particular, the knock energy is plotted by frame in FIG. 19 for a first advance firing test signal 130 (measured with a 100 kHz sampling rate on an engine rotating at 3600 rpm) where a knock event is present. In addition, the computed average frame energy is plotted at waveform 131. As can be seen, the average frame energy 131 is generally very small (e.g., <2), but when a knock event occurs at frame 18, the frame energy increases drastically. This is successfully detected by the knock detection algorithm, as shown by the point 132 in the computed average frame energy waveform 131. In contrast, FIG. 20 shows the plot of a second normal firing test signal 140 (measured with a 100 kHz sampling rate on an engine rotating at 3600 rpm), where a knock event is not present, along with the computed average frame energy plot at waveform 141. Likewise, FIG. 21 shows the plot of a third late firing test signal 150 (measured with a 100 kHz sampling rate on an engine rotating at 3600 rpm), along with the computed average frame energy plot at waveform 151, where a knock event is not present. In the absence of a significant increase in frame energy (e.g., >4 or 5), there is no increase in the computed short term energy waveform signifying detection of a knock event, as indicated by the absence of a knock event indication in FIGS. 20 and 21.

As will be appreciated, the knock detection techniques disclosed herein can be modified and used within a knock window at the sample level to identify at which sample the knock occurs. In addition, a higher accuracy can be achieved by the algorithm by reducing the number of samples in a frame. The disclosed knock detection techniques can be further optimized by computing the pitch only if there is a short term increase in the frame energy. The parameters of the knock detection algorithm may also be adjusted to be more or less stringent, such as by altering the peak detection condition or altering the average frame energy criteria. With more stringent requirements, there will be fewer knock detections, and with more relaxed requirements, there may be too many knock events detected. In addition, higher resolution in time and hence a higher accuracy can be achieved by overlapping the frames of the input data and computing the STFT of this data. However, this creates additional computational loads on the processor.

Before detecting a knock signal, the knock decision step 430 effectively evaluates the sensed signal for two conditions that signify the presence of a knock signal. In an example implementation, the presence of a predetermined pitch frequency and harmonics is detected at step 432, and an increase short term energy variations is detected in step 436. If the detected pitch frequency corresponds to the resonant and harmonic frequencies for a knock event, the pitch detection step 432 provides one of the indications of a knock event. The other indication is provided by determining whether a short-term energy increase has been detected (step 436). Increases in the short-term frame energy can be detected by comparing the current frame energy $E_n$ to the previous frame's energy and/or to the average frame energy. Generally, the average frame energy is very small, but upon the onset of a knock event, the frame energy $E_n$ increases significantly in comparison to the average frame energy. As will be appreciated, other techniques may be used to detect an increase in the short-term frame energy, such as by using predetermined thresholds for comparing the frame energy $E_n$ with the energy from previous frames.

If either or both of these conditions are not met (e.g., negative outcome to either of decisions 432, 436), then there is no knock signal indication, and the process ends (step 434). However, if both of the conditions are met (e.g., affirmative outcomes to decisions 432 and 436) and detected (affirmative outcome to decision 437), then an indication is provided that a knock signal has been detected (step 438) and the sequence ends (step 439). As will be appreciated, the indication that a knock signal has been detected may be used by an appropriate engine control algorithms to minimize the undesirable effects from the knock by adjusting the combustion operation of the engine.

The techniques described herein have been tested to show how knock events are more accurately detected using the dual condition detection scheme disclosed herein than with conventional energy-based knock detection algorithms. The testing results are listed in Table 2 which shows the wide range of conditions under which the algorithm has been tested on data from a 4 cylinder engine at various engine rpm levels and advance, normal or late firing conditions.

TABLE 2

Knock Detection Test Cases

| Test No. | RPM | Firing Condition | Actual Data | Energy-based Algorithm | Dual Condition Detection |
|---|---|---|---|---|---|
| 1 | 1200 | Advance | ✓ | ✓ | ✓ |
| 2 | 1200 | Normal | X | X | X |
| 3 | 1200 | Late | X | X | X |
| 4 | 3600 | Advance | ✓ | ✓ | ✓ |
| 5 | 3600 | Normal | X | X | X |
| 6 | 3600 | Late | X | ✓ | X |
| 7 | 4400 | Advance | ✓ | ✓ | ✓ |
| 8 | 4400 | Normal | X | X | X |
| 9 | 4400 | Late | X | ✓ | X |
| 10 | 6000 | Advance | ✓ | ✓ | ✓ |
| 11 | 6000 | Normal | X | X | X |
| 12 | 6000 | Late | X | X | X |

In Table 2, the column labeled "Actual" contains information about the presence of a knock event in the test case. The "Energy-based Algorithm" column shows the detection of knock signals when only increases in the short-term energy are used to detect knock signals. The final column shows the results of knock detection from the dual-condition detection approach disclosed herein which combines both pitch detection and short-term energy increase. The presence of knock is represented by '√' while 'X' represents the absence of knock in the signal. As can be seen, the dual-condition knock detection approach achieves 100% accuracy under various conditions, while the energy-based algorithm has false positives at test nos. 6 and 9. These tests may correspond to cases where the engine is subject to sudden vibrations (e.g., going over a pothole or railroad tracks) where the accelerometer shows higher energy levels across all frequencies, but where the pitch frequency is not detected.

Because the dual condition knock detection system and methodology described herein is based only on energy computations and control codes, it is computationally much more efficient and accurate than other techniques of knock detection which compare different time time-frequency distributions in pitch detection or rely on energy-based knock detection techniques. This makes it ideal for applications where low power is critical and real time issues are of concern, especially as compared to knock detection schemes which are more computationally intensive.

By now it should be appreciated that there has been provided a method and system for detecting knock signals in an internal combustion engine. As disclosed, a sensor structure (e.g., an accelerometer sensor or some other non-intrusive acoustic sensor for attachment to an engine cylinder) is provided that is operatively coupled to an internal combustion engine for generating sensor signal information in response to engine vibrations. Coupled to the sensor structure is a signal processing structure operatively which extracts digital signal information from the sensor signal information to identify a predetermined pitch frequency and any short-term energy increase in the digital signal information. In an example embodiment, the signal processing structure includes an ADC for sampling the sensor signal information into a digital sensor signal. In addition, the signal processing structure may include an anti-aliasing filter for digitally filtering the digital sensor signal into a filtered digital sensor signal. The signal processing structure may also include a decimator for down-sampling the filtered digital sensor signal into a decimated filtered digital sensor signal. In addition, the signal processing structure may include a short time Fourier transform module for extracting instantaneous frequency and amplitude information from the decimated filtered digital sensor signal. In a selected embodiment, the short time Fourier transform module applies a Blackman Harris window to the decimated filtered digital sensor signal to reduce frequency smearing. Finally, the signal processing structure may include a knock detection module for detecting a predetermined pitch frequency and a short-term energy increase from the instantaneous frequency and amplitude information. In a selected embodiment, the knock detection module includes a pitch detection module for computing a pitch frequency from the instantaneous frequency and amplitude information using a two-way mismatch error computation. In addition, the knock detection module includes an energy computation module for computing a short-term energy increase, such as by computing a frame energy value from the instantaneous frequency and amplitude information and then comparing the frame energy value with a frame energy value from one or more previous frames. In combination, the predetermined pitch frequency and short-term energy increase are used to generate a knock detection signal.

In another form, there is provided a method and system for obtaining engine knock data from an internal combustion engine by first acquiring analog vibration signal information from a cylinder in the internal combustion engine using a knock sensor, and then lowpass filtering the analog vibration signal information to remove high frequency components. The analog vibration signal information is then processed into frames to generate an anti-aliased, down-sampled digital time domain signal. In selected embodiments, the processing involves digitally sampling the analog vibration signal information into a digital sensor signal, lowpass digitally filtering the digital sensor signal into a filtered digital sensor signal and then decimating the filtered digital sensor signal into a decimated filtered digital sensor signal. Subsequently, the digital time domain signal is short term Fourier transformed into a digital frequency domain signal, thereby generating instantaneous frequency and amplitude information for each frame. In selected embodiments, the process of short term Fourier transforming involves multiplying the digital time domain signal and a Blackman Harris window. The instantaneous frequency and amplitude information is used to detect a predetermined pitch frequency in a frame and to detect a predetermined energy increase in a frame. For example, a predetermined pitch frequency can be detected by computing a two-way mismatch error value to select from a set of candidate pitch frequencies, while a predetermined energy increase can be detected by comparing a first energy value for a current frame with a second energy value for a previous frame, and/or by comparing a first energy value for a current frame with an average energy value for two or more previous frames (e.g., an average frame energy). If both the predetermined pitch frequency and predetermined energy increase are detected, an engine knock detection signal is generated.

In yet another form, there is provided method of detecting engine knocks wherein an analog sensor signal is generated from an accelerometer which senses engine vibrations. From the analog sensor signal, a digital signal is extracted on a frame-by-frame basis to identify a predetermined pitch frequency and any short-term energy increase in the digital signal. The digital signal extraction may be done by sampling the analog sensor signal into a digital sensor signal, anti-aliasing filtering the digital sensor signal into a filtered digital sensor signal, decimating the filtered digital sensor signal into a decimated filtered digital sensor signal, extracting instantaneous frequency and amplitude information from the decimated filtered digital sensor signal by applying a Blackman Harris windowed short time Fourier transform, and detecting a predetermined pitch frequency and a short-term energy increase from the instantaneous frequency and amplitude information. The detection of the predetermined pitch frequency may be done by computing a pitch frequency from the instantaneous frequency and amplitude information using a two-way mismatch error computation. In addition, the detection of the short-term energy increase may be done by computing a current frame energy value from the instantaneous frequency and amplitude information, and comparing the current frame energy value to a frame energy value from one or more previous frames. If both the predetermined pitch frequency and a short-term energy increase are detected in a frame, a knock detection signal is generated.

The methods and systems for detecting or predicting knock signals using a combination of pitch detection and short term energy variations as shown and described herein may be implemented in software stored on a computer-readable medium and executed as a computer program on a general purpose or special purpose computer to perform certain tasks. For a hardware implementation, the elements used to perform various signal processing steps (e.g., analog filtering, digitizing, anti-alias filtering, decimation, STFT processing, and so on) may be implemented within one or more dedicated circuits, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein are directed to various knock detection systems and methods for using same in automotive systems, the present invention is not necessarily limited to the example embodiments illustrate herein. For example, the knock detection algorithms disclosed herein may be used with any internal combustion engine. In addition, it will be appreciated that the embodiments described herein with reference certain lowpass filtering functions which may be generalized to apply to any desired filtering function which passes the signal of interest. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for detecting knock signals in an internal combustion engine, comprising:
    a sensor structure operatively coupled to the internal combustion engine for generating sensor signal information in response to engine vibrations; and
    a signal processing structure operatively coupled to the sensor structure for extracting digital signal information from the sensor signal information to identify a predetermined pitch frequency and any short-term energy increase in the digital signal information which in combination are used to generate a knock detection signal.

2. The system of claim 1, where the sensor structure comprises an accelerometer sensor.

3. The system of claim 1, where the sensor structure comprises a non-intrusive acoustic sensor for attachment to an engine cylinder.

4. The system of claim 1, where the signal processing structure comprises:
- an analog-to-digital converter for sampling the sensor signal information into a digital sensor signal;
- an anti-aliasing filter for digitally filtering the digital sensor signal into a filtered digital sensor signal;
- a decimator for down-sampling the filtered digital sensor signal into a decimated filtered digital sensor signal;
- a short time Fourier transform module for extracting instantaneous frequency and amplitude information from the decimated filtered digital sensor signal; and
- a knock detection module for detecting a predetermined pitch frequency and a short-term energy increase from the instantaneous frequency and amplitude information, where the knock detection module generates a knock detection signal if both the predetermined pitch frequency is detected and if a short-term energy increase is detected.

5. The system of claim 4, where the short time Fourier transform module applies a Blackman Harris window to the decimated filtered digital sensor signal to reduce frequency smearing.

6. The system of claim 4, where the knock detection module comprises a pitch detection module for computing a pitch frequency from the instantaneous frequency and amplitude information using a two-way mismatch error computation.

7. The system of claim 4, where the knock detection module comprises an energy computation module for computing a frame energy value from the instantaneous frequency and amplitude information.

8. The system of claim 7, where the knock detection module comprises a knock decision module for computing a short-term energy increase by comparing the frame energy value with a frame energy value from one or more previous frames.

9. A method for obtaining engine knock data from an internal combustion engine, comprising:
- acquiring analog vibration signal information from a cylinder in the internal combustion engine using a knock sensor;
- processing the analog vibration signal information by frame to generate an anti-aliased, down-sampled digital time domain signal;
- short term Fourier transforming the digital time domain signal into a digital frequency domain signal, thereby generating instantaneous frequency and amplitude information for each frame;
- detecting a predetermined pitch frequency in a frame from the instantaneous frequency and amplitude information;
- detecting a predetermined energy increase in a frame from the instantaneous frequency and amplitude information; and
- generating an engine knock detection signal if both the predetermined pitch frequency is detected and if the predetermined energy increase is detected.

10. The method of claim 9, where acquiring analog vibration signal information comprises lowpass filtering the analog vibration signal information to remove high frequency components.

11. The method of claim 9, where processing the analog vibration signal information comprises:
- digitally sampling the analog vibration signal information into a digital sensor signal;
- lowpass digitally filtering the digital sensor signal into a filtered digital sensor signal; and
- decimating the filtered digital sensor signal into a decimated filtered digital sensor signal.

12. The method of claim 9, where short term Fourier transforming the digital time domain signal comprises multiplying the digital time domain signal and a Blackman Harris window.

13. The method of claim 9, where detecting a predetermined energy increase comprises comparing a first energy value for a current frame with a second energy value for a previous frame.

14. The method of claim 9, where detecting a predetermined energy increase comprises comparing a first energy value for a current frame with an average energy value for two or more previous frames.

15. The method of claim 9, where detecting a predetermined pitch frequency comprises computing a two-way mismatch error value to select from a set of candidate pitch frequencies.

16. A method of detecting engine knocks, comprising:
- generating an analog sensor signal from an accelerometer which senses engine vibrations; and
- extracting by frame a digital signal from the analog sensor signal to identify a predetermined pitch frequency and any short-term energy increase in the digital signal;
- generating a knock detection signal if both the predetermined pitch frequency and a short-term energy increase are detected in a frame.

17. The method of claim 16, where extracting by frame a digital signal comprises:
- sampling the analog sensor signal into a digital sensor signal;
- anti-aliasing filtering the digital sensor signal into a filtered digital sensor signal;
- decimating the filtered digital sensor signal into a decimated filtered digital sensor signal;
- extracting instantaneous frequency and amplitude information from the decimated filtered digital sensor signal by applying a windowed short time Fourier transform; and
- detecting a predetermined pitch frequency and a short-term energy increase from the instantaneous frequency and amplitude information.

18. The method of claim 17, where applying a windowed short time Fourier transform comprises applying a Blackman Harris window to the decimated filtered digital sensor signal.

19. The method of claim 17, where detecting a predetermined pitch frequency and a short-term energy increase comprises computing a pitch frequency from the instantaneous frequency and amplitude information using a two-way mismatch error computation.

20. The method of claim 17, where detecting a predetermined pitch frequency and a short-term energy increase comprises computing a current frame energy value from the instantaneous frequency and amplitude information, and comparing the current frame energy value to a frame energy value from one or more previous frames.

* * * * *